US012278536B2

(12) United States Patent
Chi et al.

(10) Patent No.: US 12,278,536 B2
(45) Date of Patent: Apr. 15, 2025

(54) BRUSHLESS ELECTROMAGNETIC SUSPENSION VIBRATION MOTOR WITH SWING RODS AND ELASTIC PIECES

(71) Applicant: Guangdong huida electric appliance co. LTD, Dongguan (CN)

(72) Inventors: Zhihui Chi, Dongguan (CN); Renlin Chi, Dongguan (CN)

(73) Assignee: Guangdong Huida Electric Appliance Co. LTD, Dongguan (CN)

( * ) Notice: Subject to any disclaimer, the term of this patent is extended or adjusted under 35 U.S.C. 154(b) by 550 days.

(21) Appl. No.: 17/826,598

(22) Filed: May 27, 2022

(65) Prior Publication Data

US 2023/0198363 A1  Jun. 22, 2023

(30) Foreign Application Priority Data

Dec. 16, 2021 (CN) .......................... 202111536822.8

(51) Int. Cl.
*H02K 33/04* (2006.01)
*B26B 19/28* (2006.01)

(52) U.S. Cl.
CPC ............. *H02K 33/04* (2013.01); *B26B 19/28* (2013.01)

(58) Field of Classification Search
CPC ........ H02K 33/02; H02K 33/04; H02K 33/16; H02K 33/12; H02K 7/145; B26B 19/282
USPC ............................................... 310/20–25, 15
See application file for complete search history.

(56) References Cited

U.S. PATENT DOCUMENTS

| | | | | |
|---|---|---|---|---|
| 5,306,183 A | * | 4/1994 | Holt ....................... | H02K 21/14 440/6 |
| 5,632,087 A | * | 5/1997 | Motohashi ............ | B26B 19/282 30/43.92 |
| 5,720,160 A | * | 2/1998 | Traxler .................... | D01H 7/12 57/76 |
| 5,921,134 A | * | 7/1999 | Shiba .................... | B26B 19/282 310/20 |
| 6,181,090 B1 | * | 1/2001 | Amaya .................. | H02K 33/16 318/128 |
| 6,226,871 B1 | * | 5/2001 | Eichhorn ................ | B26B 19/28 30/346.51 |

(Continued)

FOREIGN PATENT DOCUMENTS

| | | | | |
|---|---|---|---|---|
| CN | 113315417 A | * | 8/2021 | |
| EP | 2434626 A2 | * | 3/2012 | ........... B26B 19/282 |

(Continued)

*Primary Examiner* — Maged M Almawri
(74) *Attorney, Agent, or Firm* — Birchwood IP

(57) ABSTRACT

A brushless electromagnetic suspension vibration motor with swing rods and elastic pieces is provided. A stator coil and a stator are respectively fixedly arranged inside a coil fixing base, elastic pieces are arranged on both sides of a bottom corner support, top ends of the elastic pieces are connected with an elastic piece connecting seat, the swing rods are arranged inside a through groove, bottom ends of the swing rods are fixedly connected with movers. According to the principle of magnetic induction, after the positive and negative alternating current is passed into the magnetic induction coil, under the action of the stator, the movers are urged to move back and forth in a staggered manner. When the movers move, parts above the movers are driven to follow the movement, thereby causing the elastic pieces to deform and swing back and forth.

8 Claims, 9 Drawing Sheets

(56) References Cited

U.S. PATENT DOCUMENTS

| | | | | |
|---|---|---|---|---|
| 6,991,217 | B2* | 1/2006 | Shimizu | B26B 19/288 310/12.01 |
| 7,053,507 | B2* | 5/2006 | Kobayashi | H02K 33/16 310/15 |
| 7,607,229 | B2* | 10/2009 | Motohashi | B26B 19/282 30/44 |
| 8,522,382 | B2* | 9/2013 | Lee | A46B 5/0095 15/28 |
| 8,680,723 | B2* | 3/2014 | Subramanian | H02K 33/06 310/12.01 |
| 8,720,069 | B2* | 5/2014 | Iwashita | B26B 19/048 30/346.51 |
| 8,806,756 | B2* | 8/2014 | Kraus | B26B 19/282 30/43.3 |
| 9,132,058 | B2* | 9/2015 | Imboden | A61H 19/00 |
| 10,195,752 | B2* | 2/2019 | Perlberg | B26B 19/18 |
| 11,052,553 | B2* | 7/2021 | Murakami | H02K 7/04 |
| 11,167,436 | B2* | 11/2021 | Kraus | B26B 19/28 |
| 11,581,828 | B2* | 2/2023 | Haronian | H02N 2/18 |
| 11,646,650 | B2* | 5/2023 | Li | H02K 33/02 310/20 |
| 11,791,702 | B2* | 10/2023 | Delaisse | H02K 33/04 417/413.1 |
| 11,967,881 | B1* | 4/2024 | Liu | H02K 33/00 |
| 2003/0094861 | A1* | 5/2003 | Shimizu | H02K 33/10 310/36 |
| 2005/0134123 | A1* | 6/2005 | Kobayashi | H02K 33/16 310/36 |
| 2005/0140219 | A1* | 6/2005 | Sanematsu | H02K 33/16 310/15 |
| 2006/0021227 | A1* | 2/2006 | Shiba | B26B 19/04 30/43.92 |
| 2006/0255665 | A1* | 11/2006 | Kraus | H02K 33/18 310/36 |
| 2007/0164616 | A1* | 7/2007 | Kuwabara | H02K 33/18 310/15 |
| 2008/0307654 | A1* | 12/2008 | Motohashi | B26B 19/282 30/45 |
| 2012/0150291 | A1* | 6/2012 | Aber | A61M 60/873 623/3.14 |
| 2012/0266398 | A1* | 10/2012 | Lee | A61C 17/3472 15/22.2 |
| 2016/0000543 | A1* | 1/2016 | Kobayashi | A61C 17/3481 15/22.1 |
| 2016/0190902 | A1* | 6/2016 | Skidmore | H02K 33/16 310/36 |
| 2016/0211734 | A1* | 7/2016 | Wang | H02K 33/16 |
| 2017/0033655 | A1* | 2/2017 | Wang | H02K 33/16 |
| 2019/0305659 | A1* | 10/2019 | Kitahara | H02K 33/18 |
| 2020/0188221 | A1* | 6/2020 | Lenke | A61H 9/005 |
| 2020/0360123 | A1* | 11/2020 | Li | H02K 7/145 |
| 2022/0311320 | A1* | 9/2022 | Kurita | H02K 33/16 |
| 2023/0275497 | A1* | 8/2023 | Wakabayashi | B06B 1/045 318/128 |

FOREIGN PATENT DOCUMENTS

| | | | | |
|---|---|---|---|---|
| EP | 2608371 | A2 * | 6/2013 | H02K 1/06 |
| EP | 2608372 | A2 * | 6/2013 | H02K 1/06 |
| EP | 3393020 | A1 * | 10/2018 | B26B 19/02 |
| EP | 3393021 | A1 * | 10/2018 | B26B 19/02 |
| JP | 2007104898 | A * | 4/2007 | B06B 1/045 |
| WO | WO-2004028759 | A1 * | 4/2004 | B26B 19/282 |
| WO | WO-2009041201 | A1 * | 4/2009 | B26B 19/282 |
| WO | WO-2014103226 | A1 * | 7/2014 | A61C 17/34 |
| WO | WO-2014103227 | A1 * | 7/2014 | H02K 33/16 |

* cited by examiner

BRUSHLESS ELECTROMAGNETIC SUSPENSION VIBRATION MOTOR WITH SWING RODS AND ELASTIC PIECES

CROSS-REFERENCE TO RELATED APPLICATIONS

This is a U. S. patent application which claims the priority and benefit of Chinese Patent Application Number 202111536822.8, filed on Dec. 15, 2021, the disclosure of which is incorporated herein by reference in its entirety.

TECHNICAL FIELD

The present application relates to the technical field of motors, in particular to a brushless electromagnetic suspension vibration motor with swing rods and elastic pieces.

BACKGROUND

At present, in the process of using the hair clipper, the blade used for cutting hair needs to reciprocate at a high frequency, and this process needs to be completed with the help of a motor and a transmission structure. In view of the above description, the commonly used transmission structure is usually that the motor drives the eccentric wheel to rotate at a high speed, and the eccentric wheel is connected to the end of the cutter seat, thereby realizing the high-frequency reciprocating movement of the blade. The defects are:

1. Since the eccentric wheel and the cutter seat need to be connected by rotation to realize the above transmission process, and when the rotation connection is performed, there is friction between the two, and in the use scenario of high frequency rotation, the wear of the rotating connection point between the eccentric wheel and the cutter seat is accelerated, and the replacement is frequent, which increases the cost;

2. Using the eccentric wheel drive structure, the interior of the hair clipper shell needs a larger accommodation cavity, so that the end of the hair clipper adjacent to the cutter head must be designed into a relatively thick shape, which increases the volume of the hair clipper itself;

To sum up, those skilled in the art have proposed a brushless electromagnetic suspension vibration motor.

SUMMARY

In order to solve the deficiencies of the prior art, the present application provides a brushless electromagnetic suspension vibration motor. The application solves the following problems when the drive structure of the cutter head of the existing hair clipper adopts a motor-driven eccentric wheel structure, that is, due to friction, the rotating connection point between the eccentric wheel and the cutter seat is accelerated to wear, needs to be replaced frequently, and the cost of the hair clipper is increased. A larger accommodating cavity is required in the interior of the hair clipper, so that the end of the hair clipper adjacent to the cutter head must be designed into a relatively thick shape, which increases the volume of the hair clipper itself.

To achieve the above purpose, the present application is achieved through the following technical solutions: a brushless electromagnetic suspension vibration motor, comprising a bottom corner support, wherein a coil fixing base is fixedly snapped on the top of the bottom corner support, and a stator coil and a stator are respectively fixedly arranged inside the coil fixing base, wherein the stator coil is configured to be wound on the outside of the stator, and the top of the stator is configured to protrude from the top of the coil fixing base, wherein elastic pieces are arranged on both sides of the bottom corner support, and the coil fixing base and the elastic pieces are connected together with a magnetic induction staggered opposite movement module.

Furthermore, the magnetic induction staggered opposite movement module comprises a swing rod fixed between the two elastic piece, movers are fixedly connected to the bottom end of each of the swing rods, the top ends of the two elastic pieces are jointly connected with an elastic piece connecting seat, and two sets of connecting rods are jointly rotatably connected to the top of the elastic piece connecting seat, a through groove is formed inside the elastic piece connecting seat, and a swing rod is arranged inside the through groove, and the bottom end of the swing rod is configured to be located below the elastic piece connecting seat.

Furthermore, the bottom corner support and the coil fixing base are fixedly clamped together by locking grooves and locking protrusions respectively, wherein the locking grooves are symmetrically arranged on both sides of the bottom of the coil fixing base, and the locking protrusions are fixedly connected to both sides of the top of the bottom corner support, wherein the locking grooves are configured to be matched with the locking protrusions.

Furthermore, a front supporting frame and a rear supporting frame are respectively fixedly connected to the front and back of the coil fixing base, and the front supporting frame, the rear supporting frame and the bottom corner support are all connected by frame connectors.

Furthermore, the bottom end of the elastic piece and the side wall of the bottom corner support are respectively connected by an elastic piece fixing main-seat and an elastic piece fixing sub-seat, wherein the elastic piece fixing main-seat and the elastic piece fixing sub-seat are respectively arranged on both sides of the elastic piece.

Furthermore, the movers are all configured to correspond to the positions of the stator and do not contact, and the swing rod is configured to be a "T"-shaped structure.

Furthermore, a limit seat is fixedly connected between the tops of the front supporting frame and the rear supporting frame, and a swing limit slot is formed inside the limit seat.

Furthermore, the top end of the swing rod is configured to extend above the limit seat and is fixedly connected with a driving rod, and the driving rod is configured to be located above the limiting seat.

Furthermore, the inner sides of the tops of the front supporting frame and the rear supporting frame are fixedly provided with spring limiting protrusions B, and both sides of the top of the swing rod are fixedly provided with spring limiting protrusions A, limit springs are jointly arranged between the spring limit protrusion A and the spring limit protrusion B.

Beneficial Effect

The present application provides a brushless electromagnetic suspension vibration motor. Compared with the prior art, it has the following beneficial effects:

1. A brushless electromagnetic suspension vibration motor: According to the principle of magnetic induction, after the positive and negative alternating current is passed into the magnetic induction coil, under the action of the stator, the two movers are urged to move back and forth in a staggered manner. When the mover moves, the parts above the mover are driven to follow the movement, thereby causing the elastic pieces to deform and swing back and forth. In actual use, the cutter seat is installed on the driving rod, which can directly drive the hair clipper or razor blade to move back and forth quickly. Compared with the structure of the existing motor-driven eccentric wheel, the motor-driven structure of the electromagnetic suspension structure has less wear, and thus the replacement frequency is greatly reduced, thereby reducing the use cost and improving the service life.

2. A brushless electromagnetic suspension vibration motor: In the process of driving the mover to move and the structure above the mover to follow the movement, a force will be applied to the elastic piece and the reset spring on the same side at the same time. On the one hand, this acts as a buffer; on the other hand, when the force is applied to a critical value, the elastic piece and the reset spring will simultaneously exert a reaction force, that is, a rebound force, as the power for the blade to return. By analogy, the motor drives the blade to perform high-speed reciprocating motion at all times, and when the elastic piece connecting seat moves toward each other, the provided connecting rod itself swings to increase the torque.

1. Bottom corner support; 2. Coil fixing base; 3. Stator coil; 4. Stator; 5. Locking groove; 6. Locking protrusion; 7. Front supporting frame; 8. Rear supporting frame; 9. Frame connector; 10, Elastic piece fixing main-seat; 11, Elastic piece fixing sub-seat; 12, Elastic piece; 13, Elastic piece connecting seat; 14, Through groove; 15, Swing rod; 16, Driving rod; 17, Mover; 18, Limit seat; 19, Swing limit groove; 20, Spring limit protrusion A; 21, Spring limit protrusion B; 22, Limit spring; 23, Connecting rod.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those of ordinary skill in the art without creative efforts shall fall within the protection scope of the present application.

Figure 1:
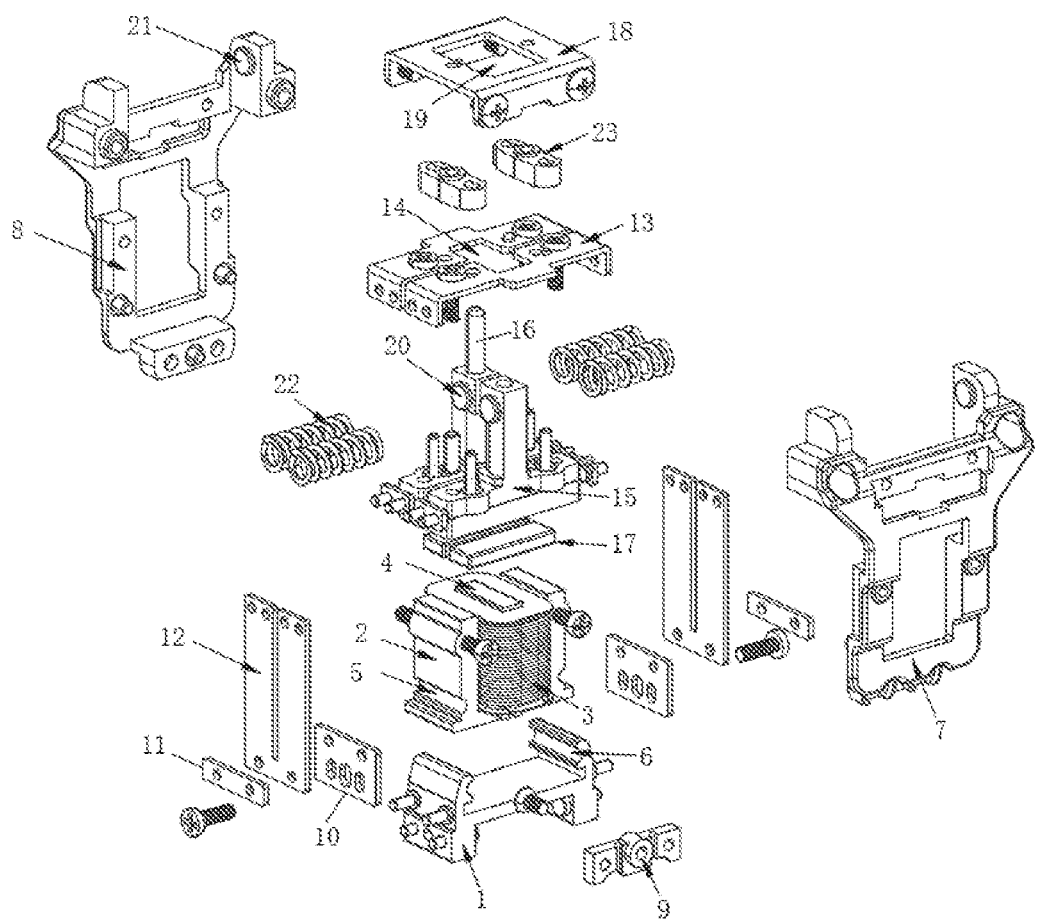
FIG. 1 is an exploded schematic structural diagram of the present application.
Figure 2:
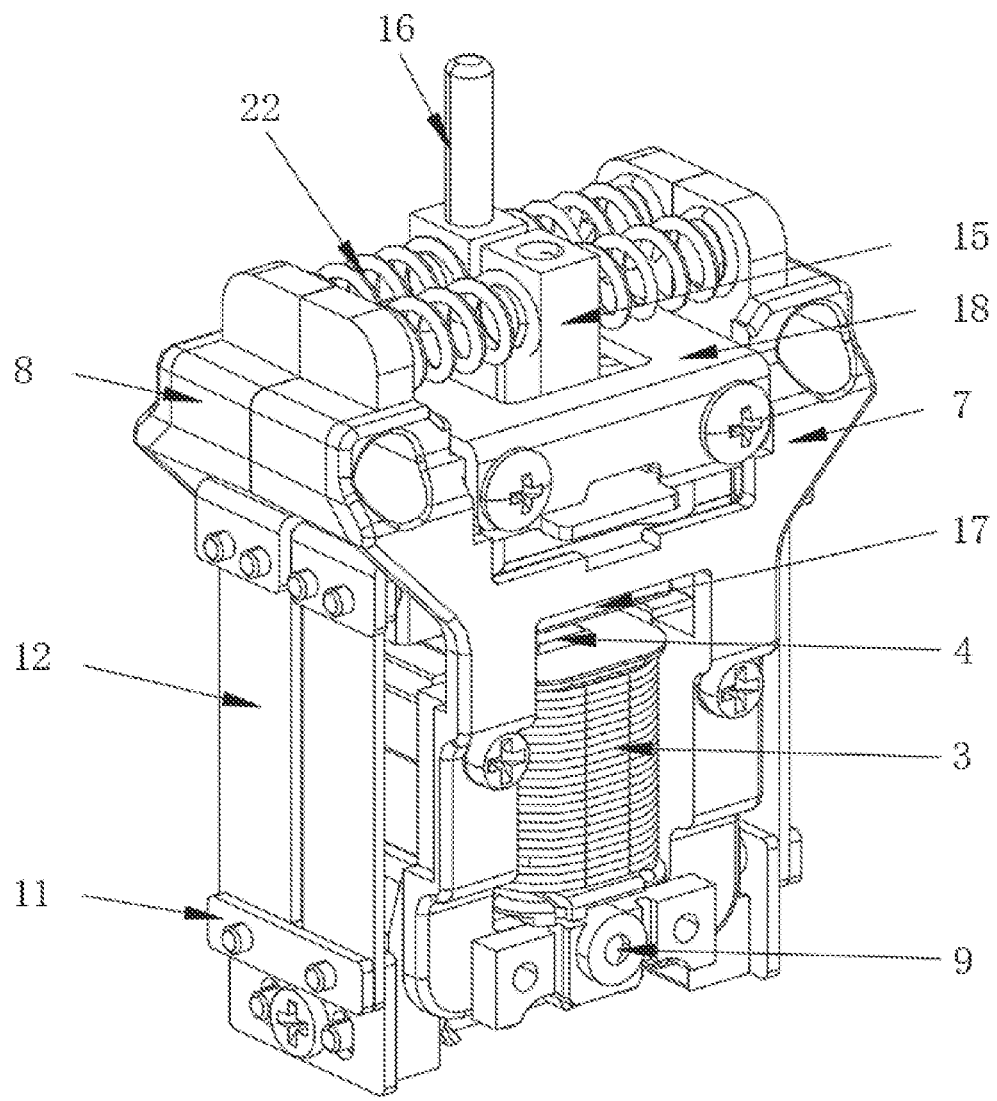
FIG. 2 is an schematic assembly structural diagram of the present application.
Figure 3:
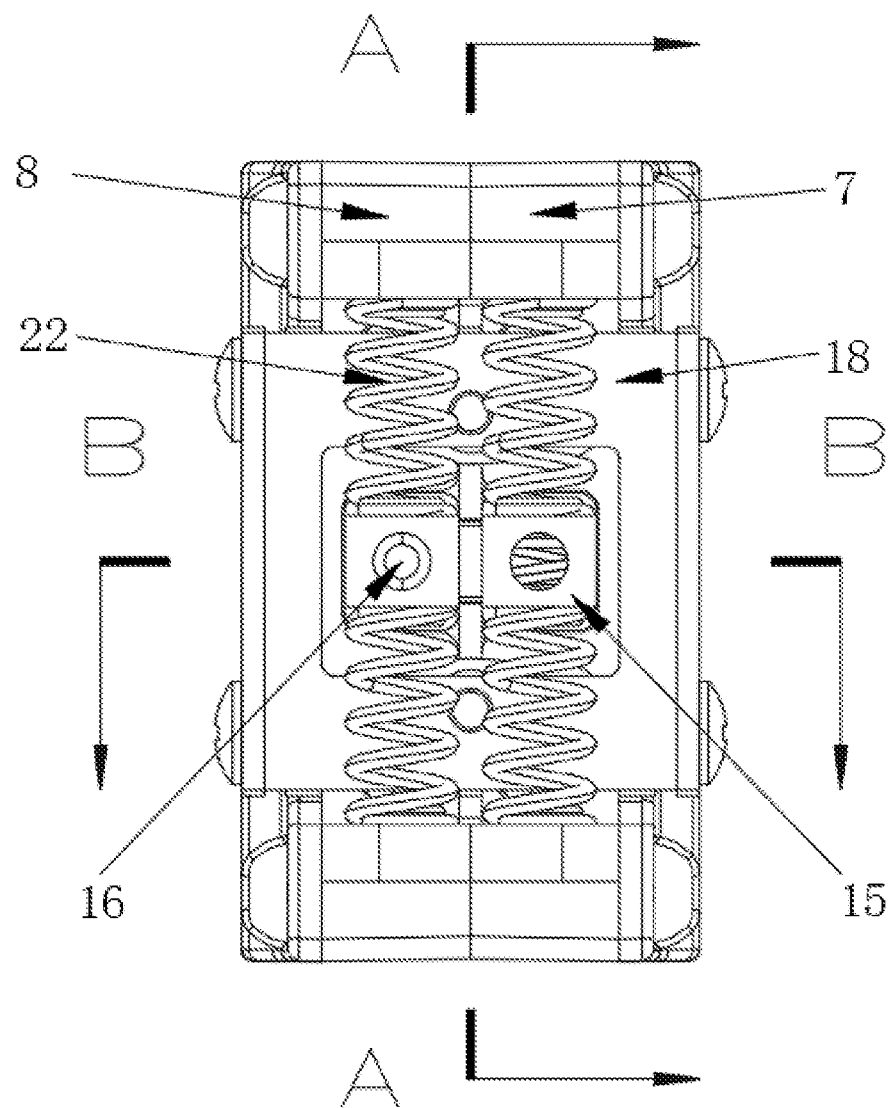
FIG. 3 is an top view of FIG. 2 of the present application.
Figure 4:
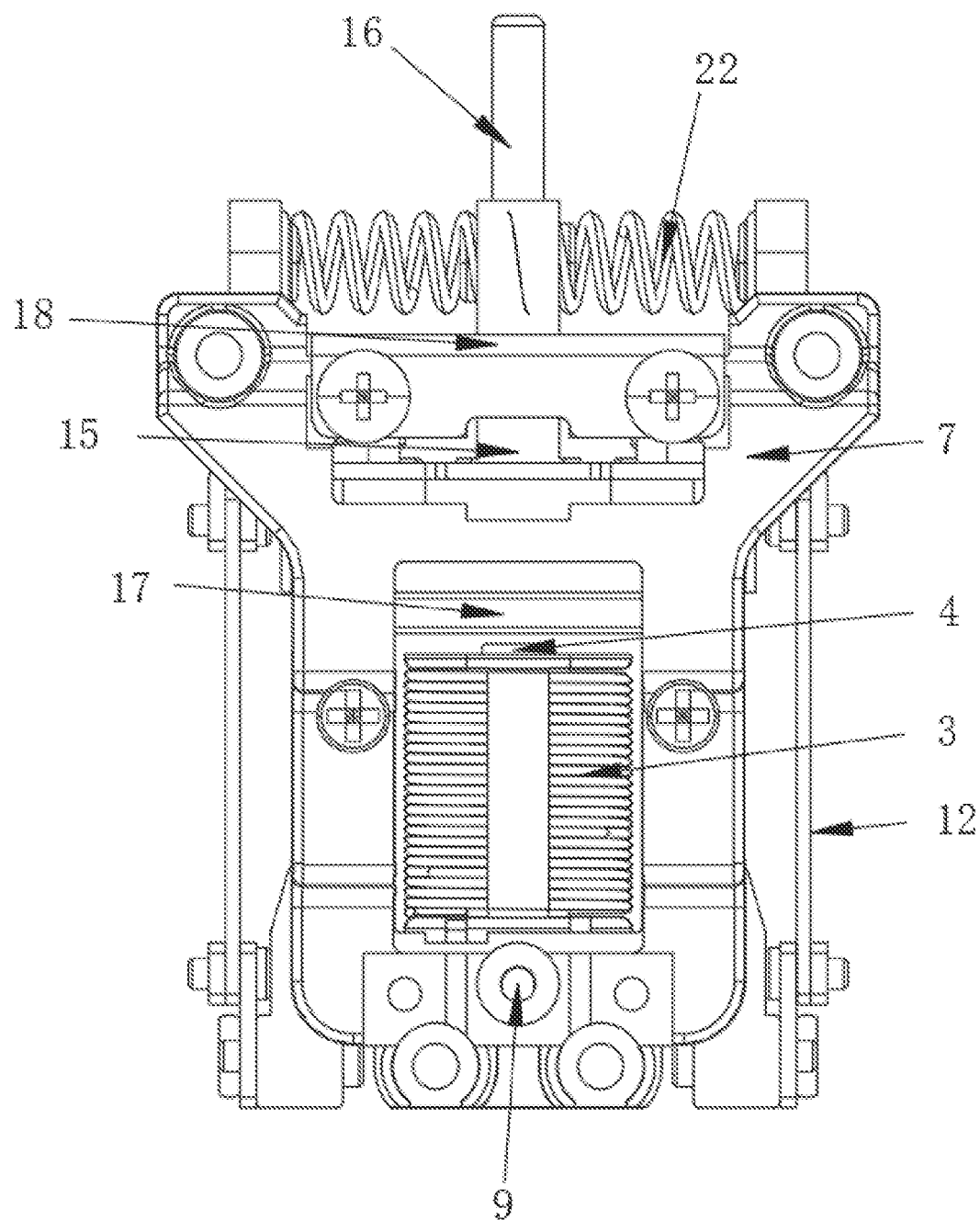
FIG. 4 is an front view of FIG. 2 of the present application.
Figure 5:
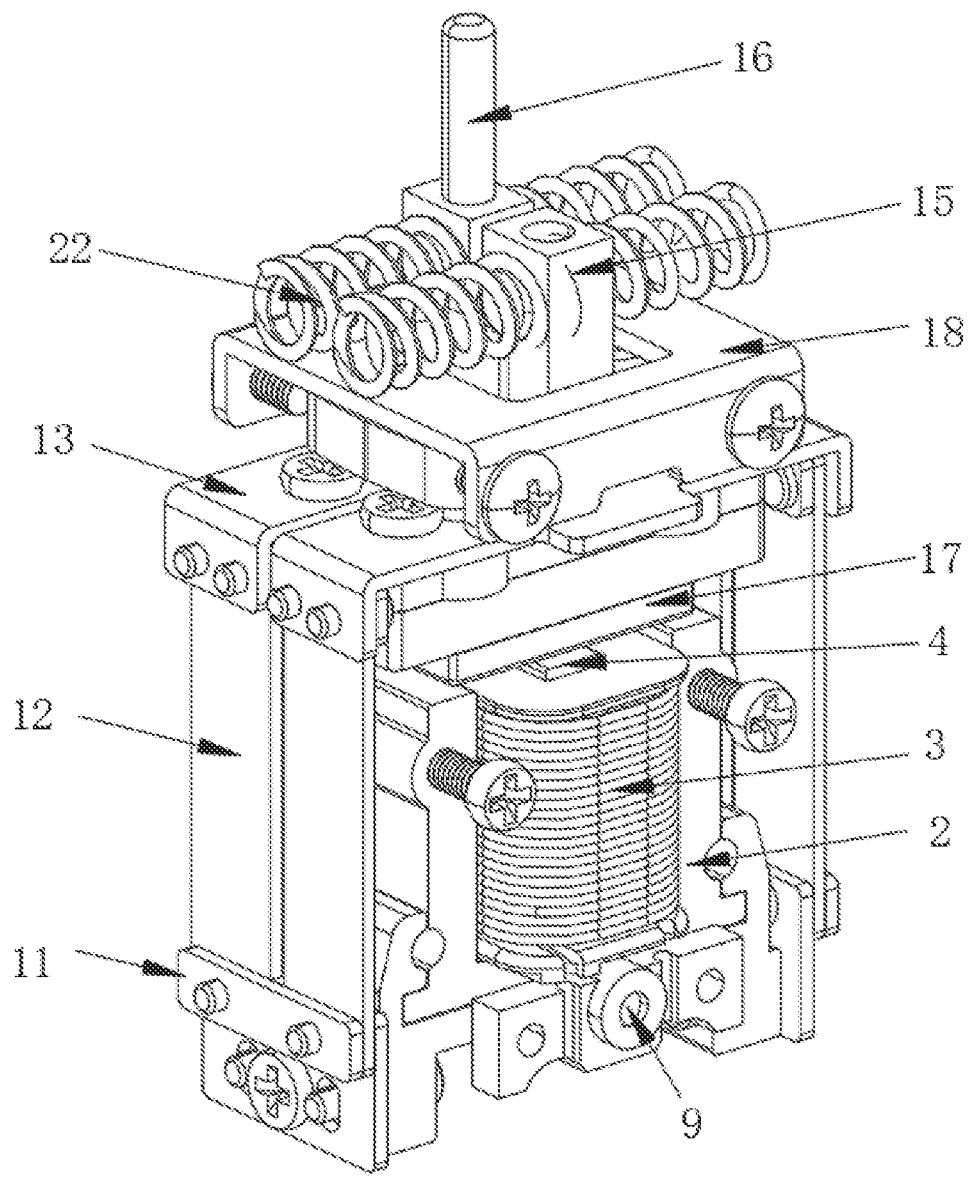
FIG. 5 is a schematic three-dimensional structural diagram of the present application after the front and rear support frames are removed.
Figure 6:
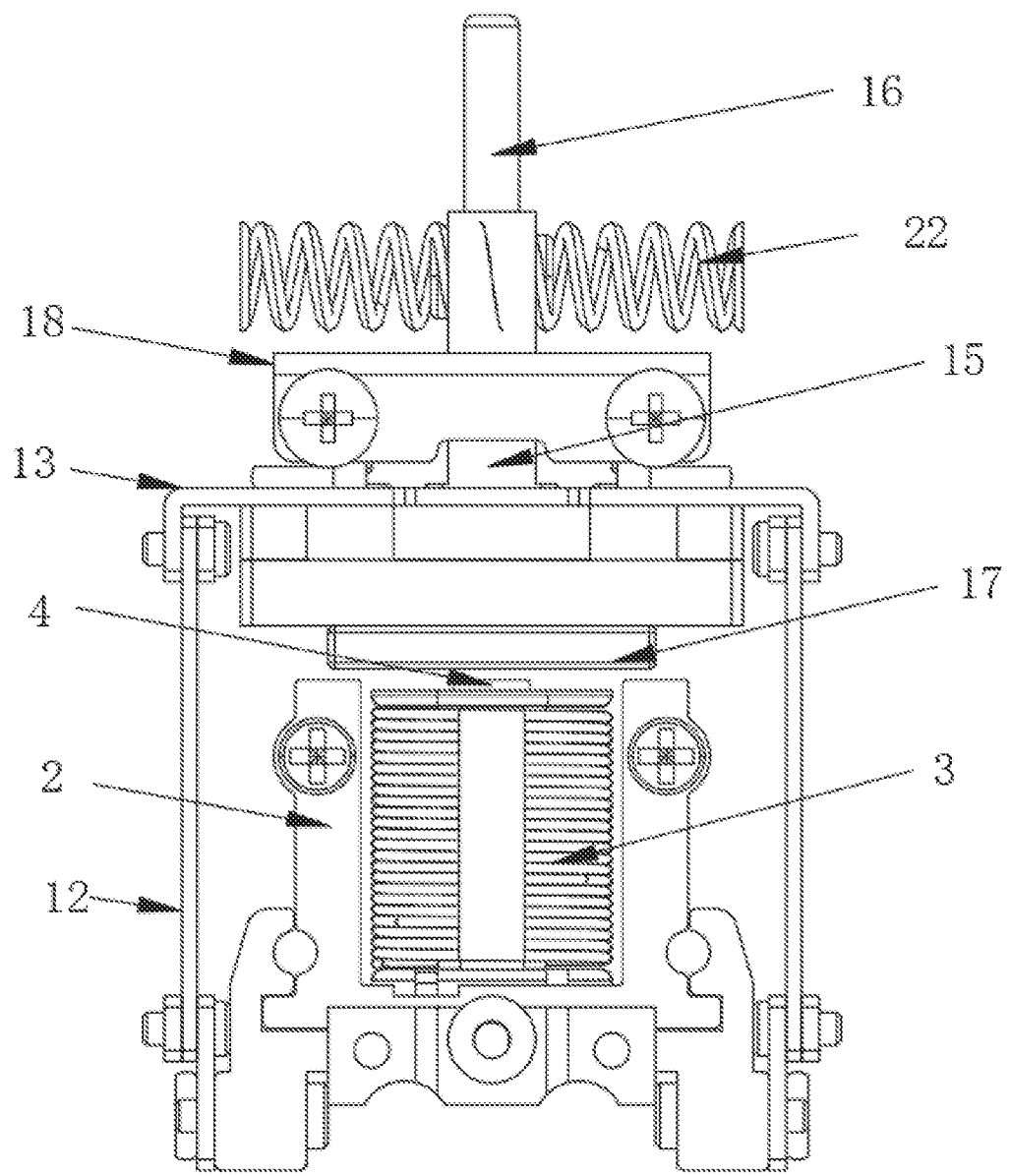
FIG. 6 is an front view of FIG. 5 of the present application.
Figure 7:
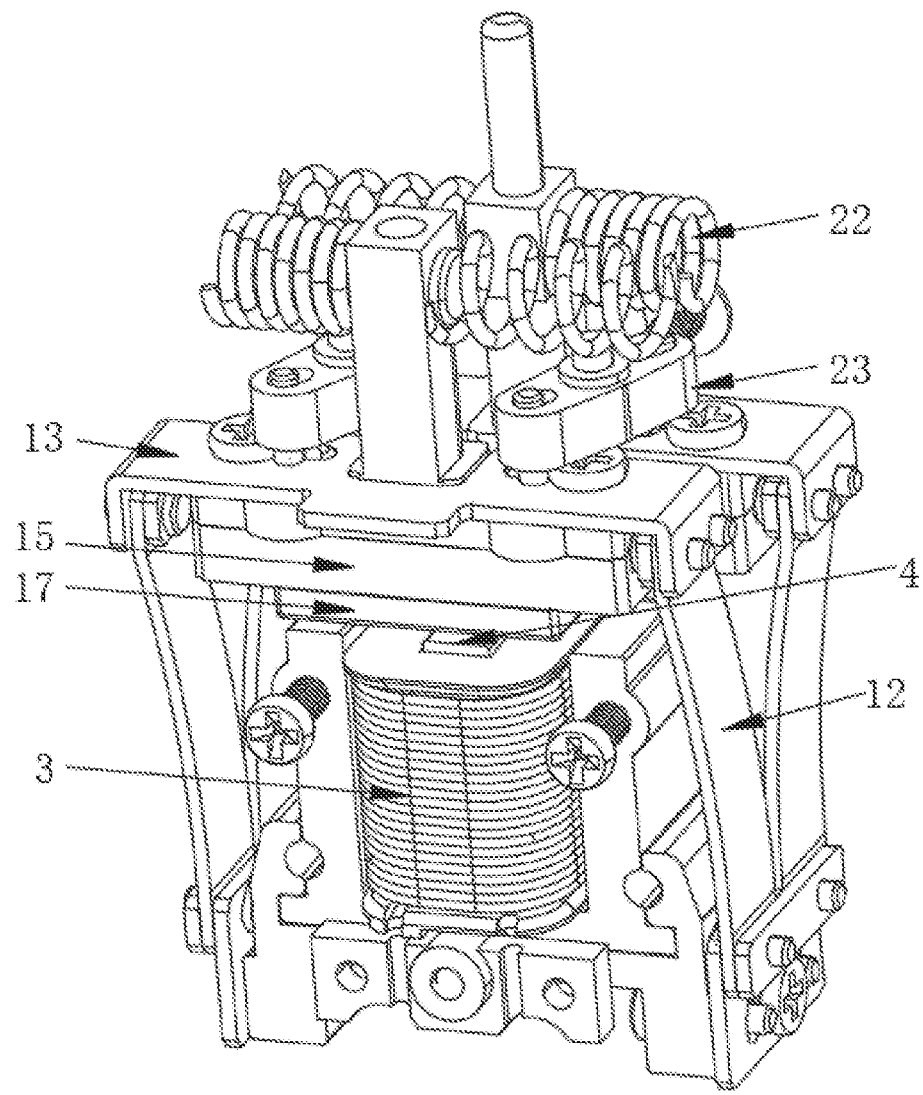
FIG. 7 is a schematic diagram of the respective deflections of the elastic piece and the connecting rod after the two swinging rods of the present application move toward each other.
Figure 8:
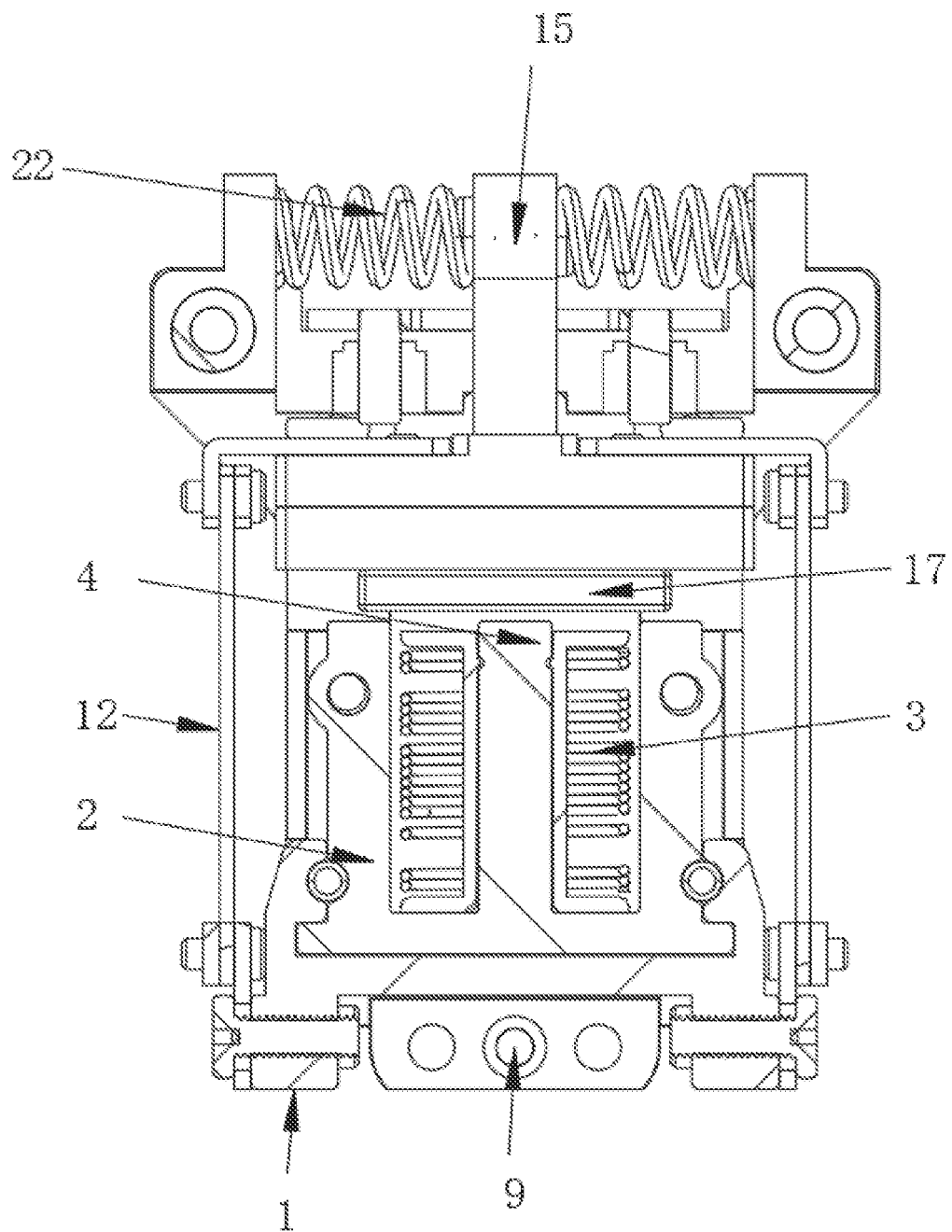
FIG. 8 is a cross-sectional view of A-A in FIG. 3 of the present application.
Figure 9:
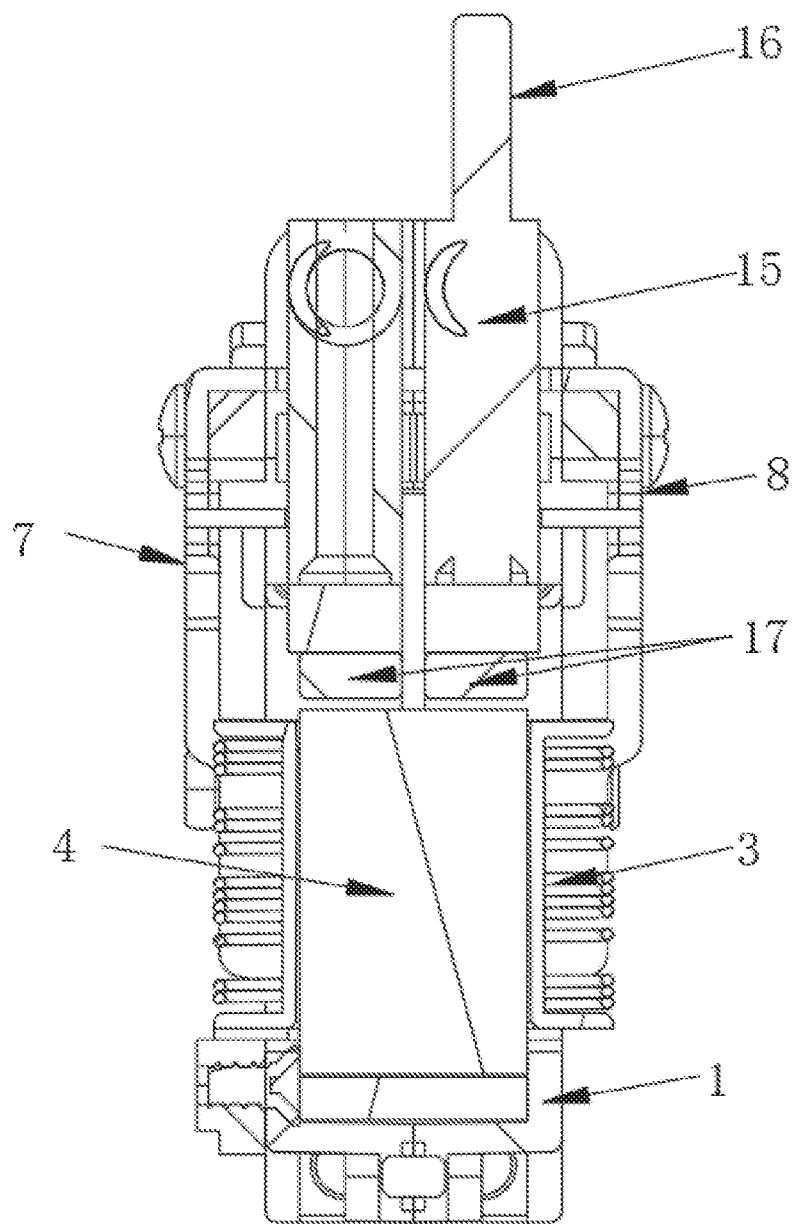
FIG. 9 is a cross-sectional view of B-B in FIG. 3 of the present application.

Please refer to FIGS. 1-9, the present application provides a technical solution: A brushless electromagnetic suspension vibration motor, comprising a bottom corner support 1, wherein a coil fixing base 2 is fixedly snapped on the top of the bottom corner support 1. The bottom corner support 1 and the coil fixing base 2 are fixedly clamped together by locking grooves 5 and locking protrusions 6 respectively, wherein the locking grooves 5 are symmetrically arranged on both sides of the bottom of the coil fixing base 2, and the locking protrusions 6 are fixedly connected to both sides of the top of the bottom corner support 1, wherein the locking grooves 5 are configured to be matched with the locking protrusions 6. The connection between the locking grooves 5 and the locking protrusions 6 makes it easier to disassemble and assemble the bottom corner support 1 and the coil fixing base 2. A front supporting frame 7 and a rear supporting frame 8 are respectively fixedly connected to the front and back of the coil fixing base 2, and the front supporting frame 7, the rear supporting frame 8 and the bottom corner support 1 are all connected by frame connectors 9. After the front supporting frame 7, the rear supporting frame 8 are installed, they can not only provide a larger support force to the entire motor, but also protect the internal structure thereof. A limit seat 18 is fixedly connected between the tops of the front supporting frame 7 and the rear supporting frame 8, and a swing limit slot 19 is formed inside the limit seat 18. A stator coil 3 and a stator 4 are respectively fixedly arranged inside the coil fixing base 2, wherein the stator coil 3 is configured to be wound on the outside of the stator 4, and the top of the stator 4 is configured to protrude from the top of the coil fixing base 2.

At the same time, elastic pieces 12 are arranged on both sides of the bottom corner support 1. The bottom end of the elastic piece 12 and the side wall of the bottom corner support 1 are respectively connected by an elastic piece fixing main-seat 10 and an elastic piece fixing sub-seat 11, wherein the elastic piece fixing main-seat 10 and the elastic piece fixing sub-seat 11 are respectively arranged on both sides of the elastic piece 12. This facilitates the disassembly and assembly of the spring 12, which in turn facilitates replacement. The top ends of the two elastic pieces 12 are jointly connected with an elastic piece connecting seat 13, and two sets of connecting rods 23 are jointly rotatably connected to the top of the elastic piece connecting seat 13, a through groove 14 is formed inside the elastic piece connecting seat 13, and a swing rod 15 is arranged inside the through groove 14. The swing rod 15 is configured to be a "T"-shaped structure and the bottom end of the swing rod 15 is configured to be located below the elastic piece connecting seat 13. Movers 17 are fixedly connected to the bottom end of each of the swing rods 15 and are all configured to correspond to the positions of the stator 4 and do not contact.

Furthermore, the top end of the swing rod 15 is configured to extend above the limit seat 18 and is fixedly connected with a driving rod 16, and the driving rod 16 is configured to be located above the limiting seat 18. The inner sides of the tops of the front supporting frame 7 and the rear supporting frame 8 are fixedly provided with spring limiting protrusions B 21, and both sides of the top of the swing rod 15 are fixedly provided with spring limiting protrusions A 20, limit springs 22 are jointly arranged between the spring limit protrusion A 20 and the spring limit protrusion B 21.

When in use, first, a forward current is passed into the stator coil 3, and under the action of the magnetic effect of the current, the stator coil 3 and the stator 4 are urged to form an induced magnetic field together, and the movers 17 will cut the induced magnetic field, so that among the two movers 17, one mover 17 moves in the forward direction, and the other mover 17 moves in the reverse direction, forming a staggered reciprocating movement;

During the reciprocating movement of the two movers 17, the corresponding movers 17 will, on the one hand, drive the corresponding swing rod 15, the elastic piece connecting seat 13 and the driving rod 16 (the driving rod 16 is equipped with a cutter seat for hair clipping or razor) move. On the other hand, when the elastic piece connecting seat 13 and the swing rod 15 move synchronously, the elastic piece connecting seat 13 exerts a force on the elastic piece 12 to cause the elastic piece 12 to bend and swing. At the same time, the two connecting rods 23 will also sway under the action of the relative movement of the elastic piece connecting seat 13, thereby increasing the torsion force (please refer to FIG. 7). Similarly, the swing rod 15 exerts a pressing force on the reset spring 22 on one side and a tensile force on the reset spring 22 on the other side, so that the reset spring 22 on one side is compressed and the reset spring 22 on the other side is elongated. When the movers 17 do not continue to move, the movers 17 are urged to reset by means of the resilient force of the elastic piece 12 and the reset spring 22. By analogy, the motor can drive the cutter seat and the blade of the hair clipper to reciprocate at a high frequency. Compared with the structure of the existing motor-driven eccentric wheel, the motor-driven structure of the electromagnetic suspension structure has less wear, and thus the replacement frequency is greatly reduced, thereby reducing the use cost and improving the service life.

It should be noted that, in this document, relational terms such as first and second are only used to distinguish one entity or operation from another entity or operation. It is not necessarily required or implied that any such actual relationship or order exists between these entities or operations. Moreover, the terms "comprise", "include" or any other variation thereof are intended to encompass non-exclusive inclusion such that a process, method, article or device comprising a list of elements includes not only those elements, but also includes other elements not expressly listed or inherent to such a process, method, article or device.

Although embodiments of the present application have been shown and described, it will be understood by those skilled in the art that various changes, modifications, amendments and substitutions can be made in these embodiments without departing from the principle and spirit of the present application. The scope of the application is defined by the appended claims and their equivalents.

What is claimed is:

1. A brushless electromagnetic suspension vibration motor, comprising a bottom corner support, wherein a coil fixing base is fixedly snapped on a top of the bottom corner support, and a stator coil and a stator are respectively fixedly arranged inside the coil fixing base, wherein the stator coil is configured to be wound on an outside of the stator, and a top of the stator is configured to protrude from a top of the coil fixing base, wherein elastic pieces are arranged on both sides of the bottom corner support, and the coil fixing base and the elastic pieces are connected together with a magnetic induction staggered opposite movement module;

wherein the magnetic induction staggered opposite movement module comprises swing rods fixed between the elastic pieces, movers are fixedly connected to bottom ends of the swing rods, top ends of the elastic pieces are jointly connected with an elastic piece connecting seat, and two sets of connecting rods are jointly rotatably connected to a top of the elastic piece connecting seat, a through groove is formed inside the elastic piece connecting seat, and the swing rods are arranged inside the through groove, bottom ends of the swing rods are configured to be located below the elastic piece connecting seat.

2. The brushless electromagnetic suspension vibration motor according to claim 1, wherein the bottom corner support and the coil fixing base are fixedly clamped together by locking grooves and locking protrusions respectively, wherein the locking grooves are symmetrically arranged on both sides of a bottom of the coil fixing base, and the locking protrusions are fixedly connected to both sides of the top of the bottom corner support, wherein the locking grooves are configured to be matched with the locking protrusions.

3. The brushless electromagnetic suspension vibration motor according to claim 1, wherein bottom ends of the elastic pieces and a side wall of the bottom corner support are respectively connected by an elastic piece fixing main-seat and an elastic piece fixing sub-seat, wherein the elastic piece fixing main-seat and the elastic piece fixing sub-seat are respectively arranged on both sides of the elastic pieces.

4. The brushless electromagnetic suspension vibration motor according to claim 1, wherein the movers are all configured to correspond to positions of the stator and do not contact, and the swing rods are configured to be "T"-shaped structures.

5. The brushless electromagnetic suspension vibration motor according to claim 1, wherein a front supporting frame and a rear supporting frame are respectively fixedly connected to a front and a back of the coil fixing base, and the front supporting frame, the rear supporting frame and the bottom corner support are all connected by frame connectors.

6. The brushless electromagnetic suspension vibration motor according to claim 5, wherein inner sides of the tops of the front supporting frame and the rear supporting frame are fixedly provided with first spring limit protrusions, and both sides of the tops of the swing rods are fixedly provided with second spring limit protrusions, limit springs are jointly arranged between the second spring limit protrusions and the first spring limit protrusions.

7. The brushless electromagnetic suspension vibration motor according to claim 5, wherein a limit seat is fixedly connected between tops of the front supporting frame and the rear supporting frame, and a swing limit slot is formed inside the limit seat.

8. The brushless electromagnetic suspension vibration motor according to claim 7, wherein top ends of the swing rods are configured to extend above the limit seat and are fixedly connected with a driving rod, and the driving rod is configured to be located above the limit seat.

* * * * *